UNITED STATES PATENT OFFICE.

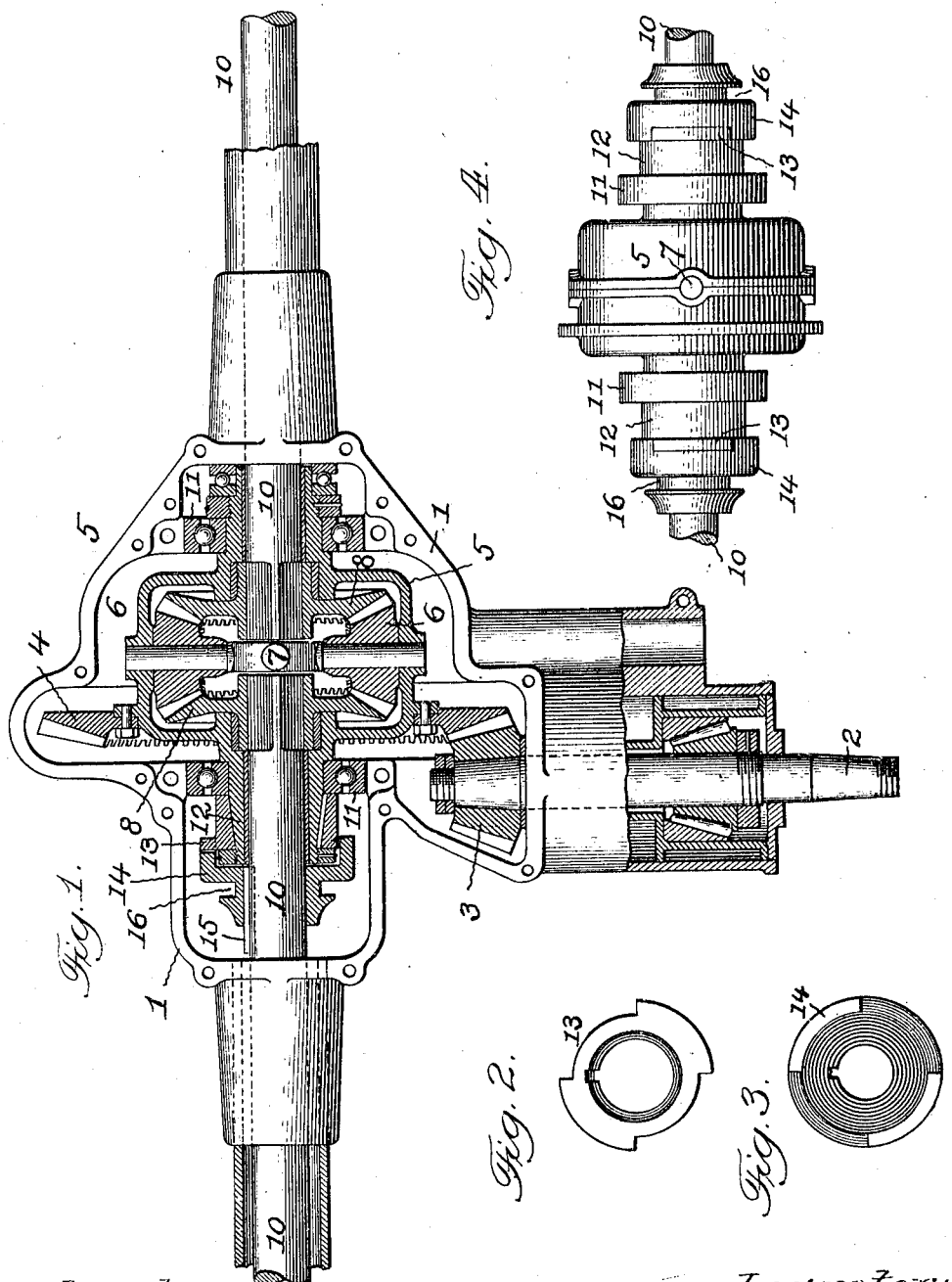

CHESTER T. BANGS, OF KANSAS CITY, MISSOURI, ASSIGNOR TO DAVID W. HENRY, OF MASON CITY, IOWA.

DRIVING-GEARING FOR MOTOR-VEHICLES.

992,104. Specification of Letters Patent. Patented May 9, 1911.

Application filed August 31, 1909. Serial No. 515,512.

*To all whom it may concern:*

Be it known that I, CHESTER T. BANGS, a citizen of the United States of America, and a resident of Kansas City, in the county of Jackson and State of Missouri, have invented certain new and useful Improvements in Driving-Gearing for Motor-Vehicles, of which the following is a specification.

This invention relates to the differential driving gearing of motor vehicles, and has for its object to provide a simple and efficient structural arrangement and combination of parts, which in addition to providing for unequal distance of travel of the inside and outside wheels when turning in a circle, is also adapted to obviate the trouble experienced on wet pavements and at times when one wheel is in soft and slippery mud and the other wheel on material which affords efficient traction, in that the power follows the wheel having the least tractive force and in consequence such wheel will revolve while the other remains stationary and the vehicle will not move until the slipping wheel grinds down to hard ground, all as will hereinafter more fully appear.

In the accompanying drawings:—Figure 1, is a detail horizontal sectional elevation, illustrating the present improvement, in its preferred form, and as applied to the direct bevel gear differential transmission of an automobile. Fig. 2, is a detail end elevation of the non-adjustable clutch member. Fig. 3, is a similar view of the adjustable clutch member. Fig. 4, is a detail elevation illustrating the duplex arrangement of the clutches of the present invention.

Similar numerals of reference indicate like parts in the several views.

Referring to the drawings, 1 represents the usual inclosing casing or shell for the adjacent ends of the shaft, differential gearing, etc., of the motor vehicle driving gearing. 2 is the driving or pinion shaft journaled near its near end in said casing 1, and carrying the driving pinion 3, which meshes with and drives a bevel gear 4, secured to the differential gear housing 5 as shown.

6 are a series of planetary bevel gears carried within the housing 5, upon the carrying spider or star 7, which spider is connected to and rotates with the housing 5 aforesaid.

8 are bevel gears arranged at opposite sides of the aforesaid bevel gears 6, and having meshing engagement therewith. Said gears 6 are fixed on the ends of the respective countershafts 10, which may be the axle sections of the driving axle of an automobile, or the usual countershaft which have chain and sprocket connection with the driving wheels of an automobile or the like.

11 are bearings, usually of the ball type, arranged between the differential gear housing 5 and the inclosing casing 1, to maintain concentric relation between said parts and their accessories.

The mechanism so far described is usual in automobile driving gearing, and the present invention involves in connection therewith a construction as follows: 12 is a hub extension at one or both sides of the differential gear housing 5, and extending out beyond the adjacent bearing 11, as shown more particularly in Fig. 1.

13 is a non-adjustable clutch member, preferably of the toothed form shown, and fixedly attached to the outer end of the aforesaid hub.

14 is an adjustable clutch member, of a tooth form corresponding with that of the non-adjustable clutch member 13, and adapted for engagement therewith. Said clutch member 14 while longitudinally adjustable on its carrying countershaft 10 is held against independent rotation thereon, preferably by means of a key 15 and a keyway as shown.

16 is a peripheral groove in the hub portion of the adjustable clutch member 14; such groove is adapted for engagement with an end of a suitable operating arm or lever by which the clutch members are brought into engagement, when it is desired to prevent the slipping of the vehicle wheel which has driving engagement with the countershaft carrying the aforesaid movable clutch member.

In my preferred construction, as shown in Fig. 1, the above described clutch construction is shown on one countershaft 10, to afford locking connection between said countershaft and the differential gear housing 5. It is however within the province of present invention to arrange counterpart clutch mechanisms on each countershaft 10 when desired and as illustrated in Fig. 4.

Under normal conditions in the operation of the motor vehicle, the clutch members 13 and 14 of the present mechanism will remain in an unclutched and inactive condition, and will only be brought into clutching engagement to lock the pair of driving wheels of the vehicle together, to rotate in unison, in order to prevent slipping and grinding of one or the other of said driving wheels when one wheel is on a wet, soft or muddy portion of the roadway and the other wheel is on a portion of the roadway affording traction. Under the above mentioned condition of the roadway, the power follows the driving wheel meeting the least resistance, and in consequence said wheel will rotate while the other remains stationary and the vehicle will not move until the slipping wheel grinds down to hard ground affording the required traction.

Having thus fully described my said invention what I claim as new and desire to secure by Letters Patent, is

1. In a driving gearing for motor vehicles, the combination of driving and driven shafts, a gear housing, differential gearing therein connected to said shafts, a non-adjustable clutch member carried by said gear housing, and an adjustable clutch member mounted on a driven shaft and adapted for engagement with the other clutch member to provide locking engagement between said driven shaft and gear housing, substantially as set forth.

2. In a driving gearing for motor vehicles, the combination of driving and driven shafts, a gear housing, differential gearing therein connected to said shafts, said housing having an extended hub, a non-adjustable clutch member attached to said hub, and an adjustable clutch member mounted on a driven shaft and adapted for engagement with the other clutch member to provide locking engagement between said driven shaft and gear housing, substantially as set forth.

Signed at Kansas City, Missouri, this 28th day of August 1909.

CHESTER T. BANGS.

Witnesses:
JAS. L. MARTIN,
S. C. PENNICK.